Dec. 15, 1964   W. R. WILLETTE ETAL   3,161,006
ADJUSTABLE ROTARY MOWER
Original Filed Nov. 12, 1959   5 Sheets-Sheet 1
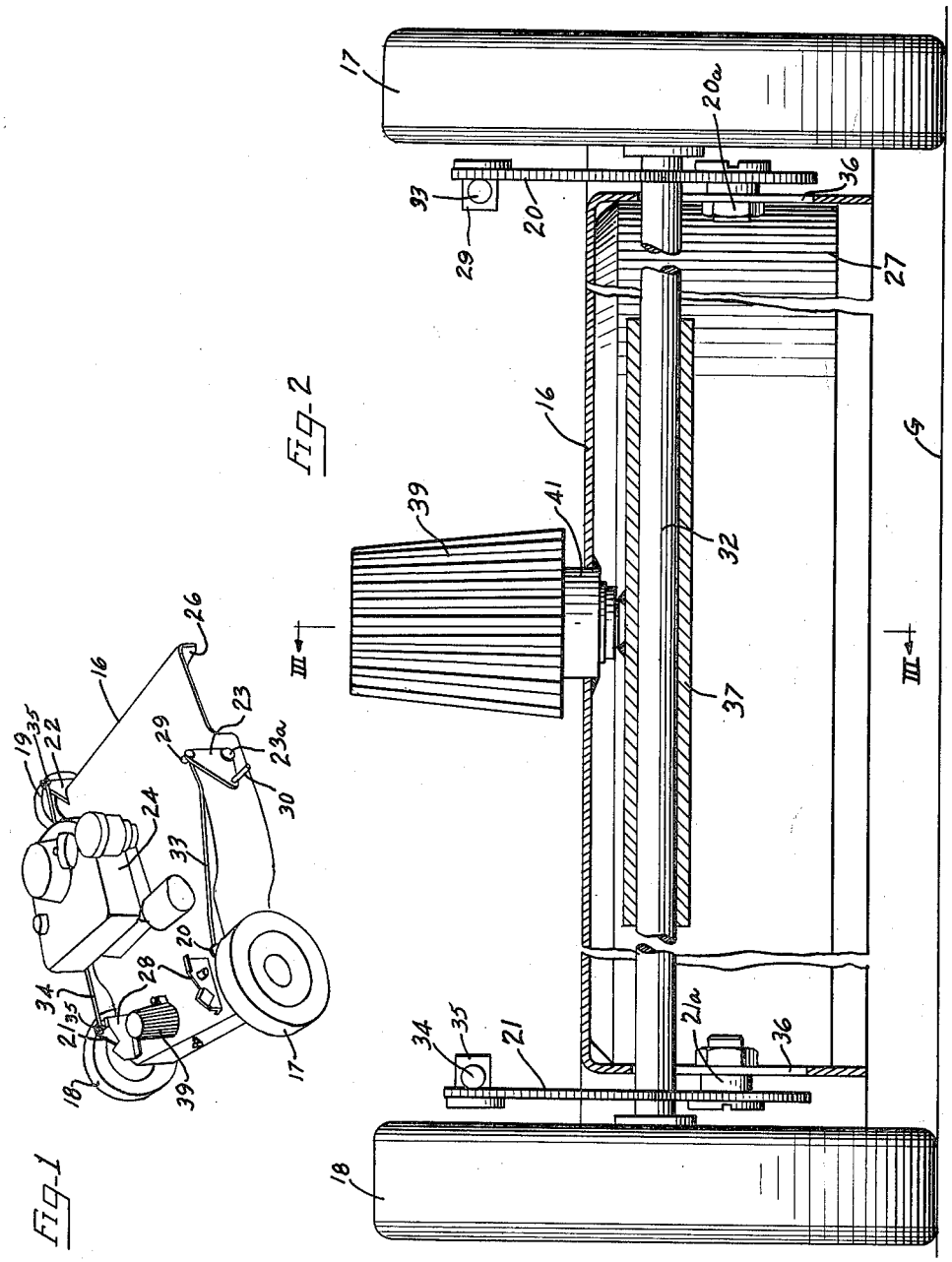
Inventors
Wayne Ronald Willette
Arnold Andrew De Baillie
by Hill, Sherman, Meroni, Gross & Simpson Attys.

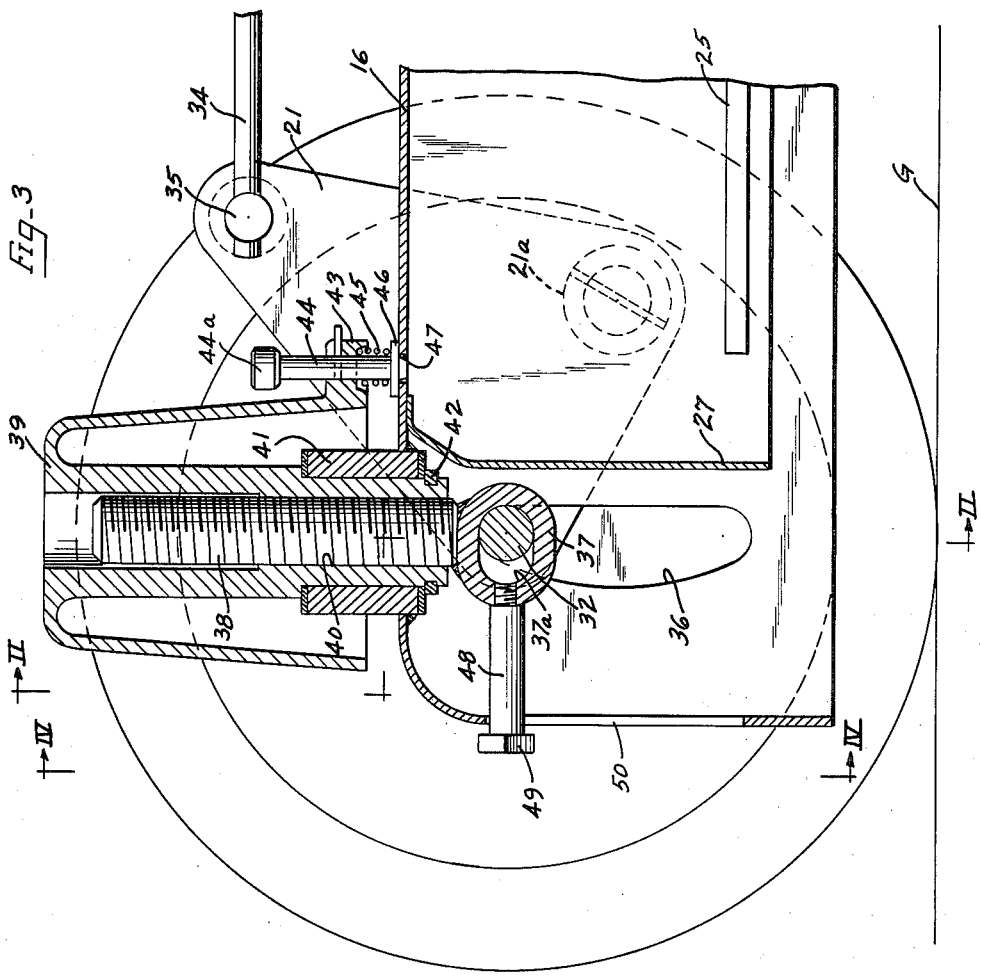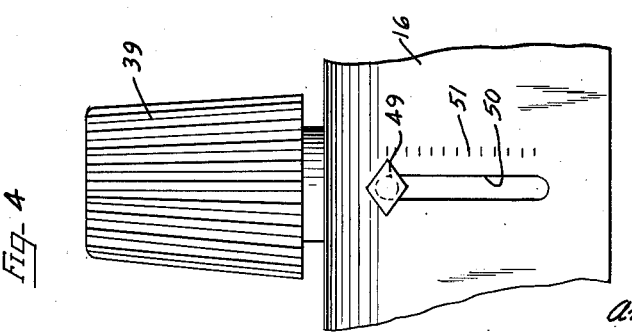

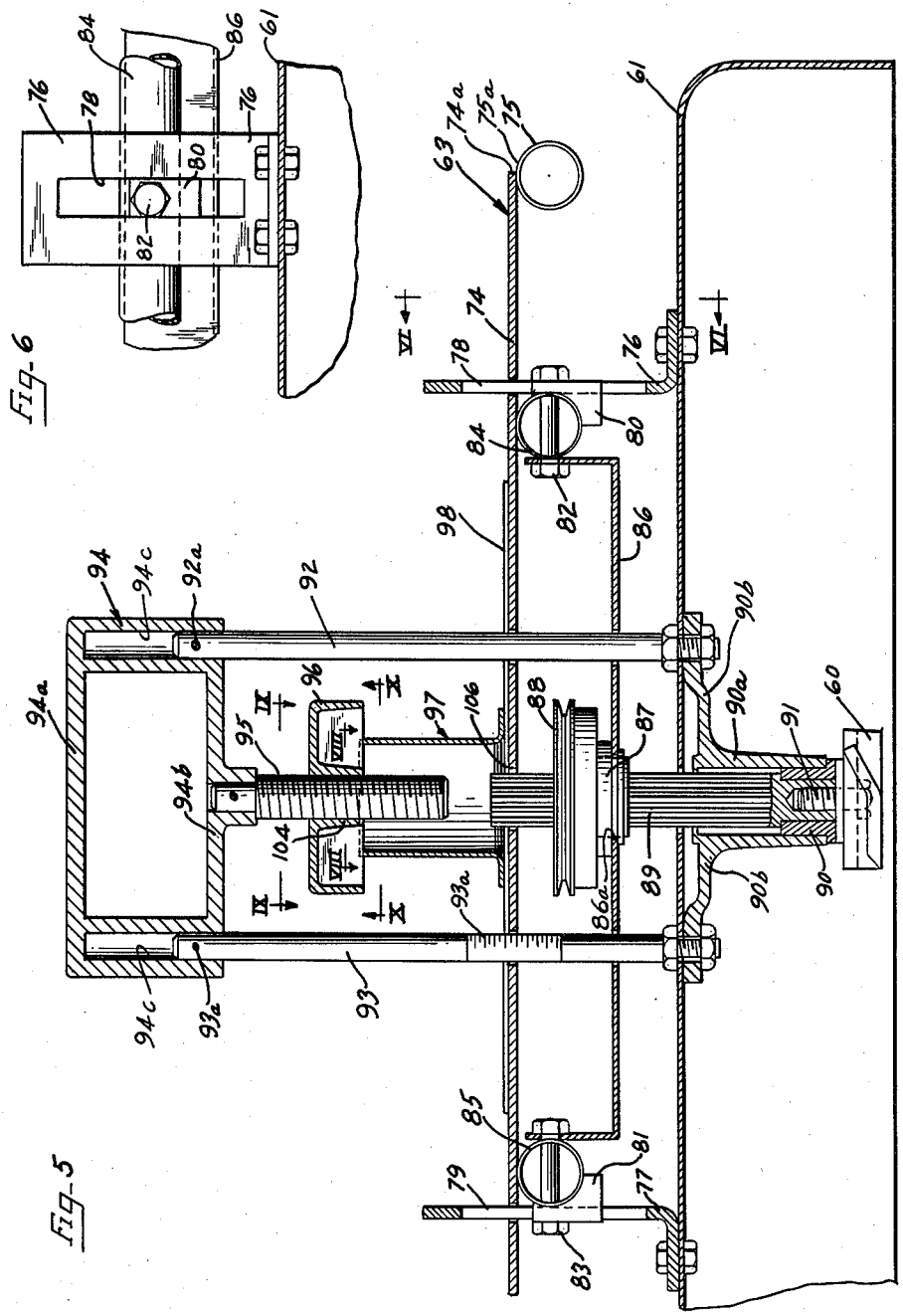

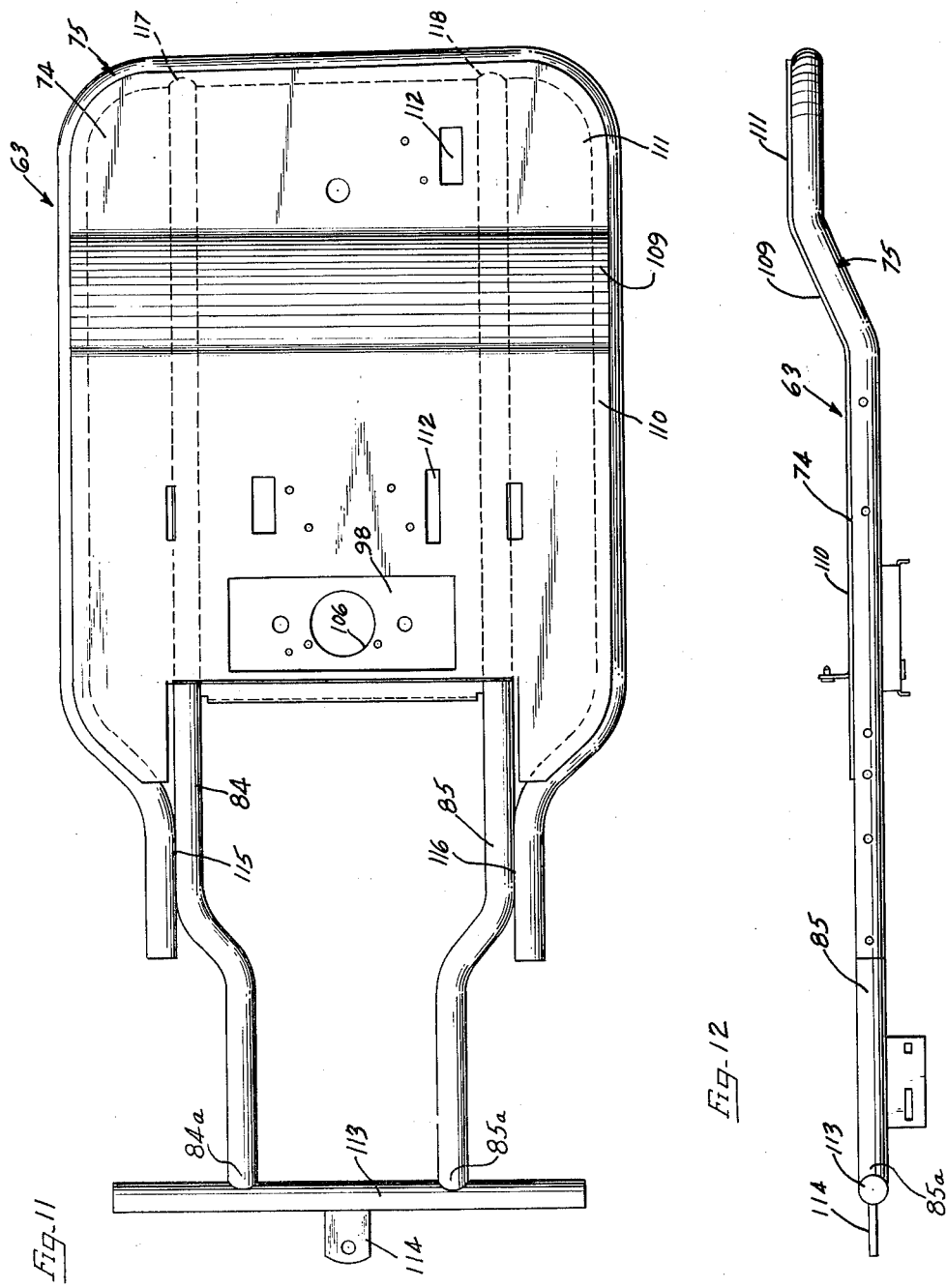

United States Patent Office 3,161,006
Patented Dec. 15, 1964

3,161,006
ADJUSTABLE ROTARY MOWER
Wayne Ronald Willette, Minneapolis, Minn., and Arnold Andrew De Baillie, Evansville, Ind., assignors, by mesne assignments, to Hahn Inc., a corporation of Indiana
Filed Aug. 31, 1962, Ser. No. 221,930
2 Claims. (Cl. 56—25.4)

The present invention relates to improvements in power mowers and particularly to a mechanism for adjusting the height of a cutter on a power mower, especially for a hand propelled or a riding mower with a high speed engine driven rotating cutting blade beneath the mower, the instant application being a continuation of patent application Serial No. 852,434, now abandoned, filed November 12, 1959, for Adjustable Rotary Mower.

In mowers especially of the type for cutting home lawns it is important to provide for adjustment of the height of cut. The grass for any lawn has an optimum cutting height dependent on various factors. If a mower is to be readily used on different lawns or in different cutting areas, different types of cut will be required for cutting lawns or for cutting weed areas. Different lawns having different strains or breeds of grass will have different optimum heights of cut. Even the same lawn has varying optimum heights of cut dependent upon the season of the year at which is it cut, upon the rain fall or drought experienced at the time of cutting, and upon the thickness of the turf. In some instances even different areas of the same lawn have different optimum heights of cut for the same mowing. With a mower of the type having a high speed rotating blade, referred to as a rotary mower, the grass clippings are chopped, and control of the chopped lengths and of the cutting effects can be obtained with adjustment of the height of the cutting blade. Cutting at an optimum height is frequently sacrificed because of the difficulty of adjustment of the cutting height of a mower and because of the difficulty of an accurate knowledge of the height at which the mower is cutting even if the optimum height is known.

It is accordingly an objective of the present invention to provide a power driven mower with improved mechanism for adjusting the cutting height.

Another object object of the invention is to provide a power mower wherein the cutting height is so simply adjusted that it can be done quickly and frequently and so that the operator can always cut the lawn at the optimum height without experiencing difficulty.

Another object of the invention is to provide an improved type adjustment mechanism for a power mower capable of adjusting the height of each of the wheels simultaneously relative to the cutter.

A still further object of the invention is to provide an adjustable power mower wherein the cutting height can be adjusted during operation and without stopping the mower.

A still further object of the invention is to provide an adjustment mechanism for a power mower especially of the rotary type wherein the safety of the operator is enhanced and he does not have to be near the blade in order to adjust the operating height.

A further object of the invention is to provide an improved cutting height adjustment mechanism for a rotary mower especially well adapted for use on a riding mower wherein the operator can quickly and easily adjust the cutting height from the mower seat without necessarily stopping the mower and during cutting operation.

A further object of the invention is to provide an improved frame for an adjustable power mower.

Other objects and advantages will become more apparent with the teaching of the principles of the invention in connection with the disclosure of the preferred embodiments thereof in the specification, claims and drawings, in which:

FIGURE 1 is a perspective view of a power mower, shown with parts removed, embodying the principles of the present invention;

FIGURE 2 is a vertical sectional view taken through the rear of the mower susbtantially along line II—II of FIGURE 3;

FIGURE 3 is a vertical sectional view taken substantially along line III—III of FIGURE 2 and having parts broken away;

FIGURE 4 is a fragmentary view taken substantially alone line IV—IV of FIGURE 3;

FIGURE 5 is an enlarged vertical sectional view taken substantially along line V—V of FIGURE 7, and illustrating a modified form of adjustment mechanism for a riding mower;

FIGURE 6 is a vertical sectional view taken substantially along line VI—VI of FIGURE 5;

FIGURE 11 is a top plan view of the frame of the mower of FIGURE 7; and

FIGURE 12 is a side elevational view of the frame of FIGURE 11.

As shown on the Drawings:

Figure 7:
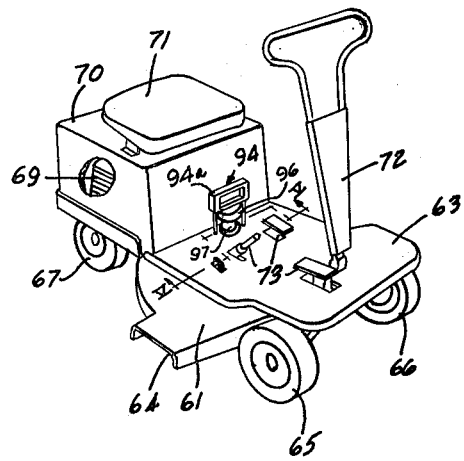
FIGURE 7 is a perspective view of a riding mower embodying the modified form of the invention.

FIGURE 1 illustrates a power rotary mower of the type which may be pushed and has a housing 16 with rear wheels 17 and 18 at the sides and front wheels 19, with one of the front wheels removed for purposes of illustrating its support. The wheels are connected to the housing 16 by adjustable wheel mounts 20, 21, 22, and 23. The adjustable mounts are illustrated in the preferred form as being pivotal mounting plates each supoprted on a shouldered bolt such as 20a, 21a and 23a respectively for the mounting plates 20, 21 and 23, FIGURES 1, 2 and 3.

The wheels are rotatably supported on the mounting plates eccentrically of the pivotal axis of the plates. The front wheels are supported on stub shafts, such as 30 for the plate 23. The rear wheels 17 and 18 are also supported on a shaft mounted eccentric of the pivotal axes of the plates 20 and 21, and in the preferred form a one piece cross shaft 32 is employed, this shaft performing a dual function of also acting as an adjustment member for adjusting the height of the wheels relative to the housing 16.

Mounted on top of the housing is an engine 24 for driving a cutter 25 enclosed beneath the housing and exposed to the grass through the open bottom thereof. The housing is formed with a chute 26 on one side for expelling the grass clippings. An apron or baffle 27 extends down within the housing at the rear edge for preventing the clippings from being thrown against the adjustment shaft 32 and its associated mechanism.

Connecting rods 33 and 34 are secured to the pivotal mounting plates such as by connecting pins 29 and 35, FIGURES 1 and 3. It will be noted that the wheels' mounts are thus rigidly interconnected with the front and rear wheels on each side interconnected by the rods 33 and 34 and the rear wheels interconnected by the shaft 32 in such a manner that the elevation of each of the wheels with respect to the housing and the cutter 25 remains the same and the wheels can be simultaneously adjusted to control the height of the blade 25 above the ground G and therefore the height to which the grass is cut.

To accommodate vertical movement of the rear adjustment shaft 32, arcuate slots 36 are formed in each side of the housing 16. A collar 37 surrounds the shaft 32 and has a longitudinally elongated slot 37a therein to permit vertical movement of the collar while the shaft moves arcuately. Attached at the top of the collar such as by welding is a threaded adjustment rod 38 which is adjustably threaded into a vertical threaded opening 40 in an adjustment knob 39.

The adjustment knob 39 is rotatably mounted on a bearing 41 secured at the back of the housing 16 and the knob is locked in the bearing by a snap ring 42. The knob is conveniently of a large size, is ribbed and is somewhat conically shaped for ease of gripping. The knob is also conveniently located at the center of the back of the housing accessible to the operator who grips a handle (not shown) attached to handle brackets 28 on the housing.

The adjustment knob 39 is locked against rotation, while the mower is being pushed, by a locking pin 44 carried in a projection 43 on the knob. The pin has an enlarged head 44a for drawing it upwarly and a coil compression spring 45 beneath the projection engages a collar 46 on the pin to urge its lower end into locking engagement with an opening 47 in the housing. When the knob 39 is to be rotated the pin is lifted out of the opening 47.

In order that the exact adjusted position of the cutter relative to the ground will be known, and can be observed while adjustment is being made, an indicating means is provided. The indicating means is illustrated as preferably taking the form of an indicator pin 48 with a pointer 49 at the end. The indicator pin passes through a vertical slot 50 in the housing 16 and the housing carries index markings 51 accurately showing the adjusted height of the cutter.

In the arrangement of FIGURES 5 through 12, a cutter 60 in the form of a rotatable blade supported for rotation on a vertical axis is mounted within a housing 61 formed of sheet metal, cast or of suitable construction. As illustrated in FIGURE 7, the housing has a side chute 64 for expulsion of grass clippings and is carried on a frame 63. The entire mower is movable on wheels such as 65, 66 and 67 rotatably mounted on the frame. An engine 69 is mounted at the rear of the frame within an engine hood 70 and a seat 71 is rigidly supported on the frame. A steering handle 72 is located at the front end of the frame connected to the front wheels 65, and 66 such as by automotive type steering linkage. Foot and hand operated controls such as 73 are provided for operating suitable control devices for controlling the speed of the engine and operating a brake and a clutch.

As illustrated in FIGURES 5, 11 and 12 the frame 63 is uniquely fabricated for improved strength and functional characteristics and includes a flat surfaced deck plate 74 joined at its edges 74a to a shaped tubular main frame member 75. The deck plate extends to join the main frame at a point of tangency on the upper curved surface 75a thereof and may be joined such as by welding (not shown) at spaced locations so as to provide a strong frame and one which is attractive and also smooth and finished to prevent injury to operating personnel.

The housing 61 and the cutter 60 are mounted for vertical adjustable movement by being supported on the frame 63. To guide the housing and give it rigidity during high speed rotation of the blade 60, vertical brackets 76 and 77 are bolted to the top of the housing and extend up through slots in the deck plate 74. The brackets are held horizontally stable with respect to the frame by guide lugs 80 and 81 which slide in vertical slots 78 and 79 in the brackets 76 and 77. The guide lugs are rigidly secured to longitudinal tubular frame members 84 and 85 by bolts 82 and 83.

The bolts also support a bearing pan 86 which extends across between the frame members 84 and 85 and has an opening 86a to which is secured a bearing 87. Rotatably carried on the bearing 87 is a drive pulley 88 which is drivingly connected to a vertical cutter shaft 89 which is splined for this purpose. This drive mechanism including the pulley 88 and the shaft 89 provides a driving connection from the engine 69 to the cutter 60 which accommodates relative vertical movement of the cutter during operation and without stopping the cutter. The cutter or blade 60 is secured such as by a bolt 91 to the lower end of the splined shaft 89. The lower end of the splined shaft is supported in a bearing 90 held in a bearing housing 90a having lateral arms 90b for securing it to the housing. The lateral arms are secured to vertical lifting rods 92 and 93, FIGURE 5.

The lifting rods 92 and 93 support the cutter at its adjusted height during operation and permit the cutter to be manually lifted when the height adjustment is to be changed. For this purpose, the upper ends of the lifting rods are secured to a yoke 94 having an upper handle portion 94a. The yoke is connected to the lifting rod such as by cross pins 92a and 93a locking the rods in drilled holes 94c in the yoke.

The yoke and its handle portion 94a are located directly in front of the seat 71 so that the operator can merely reach down and manually lift the cutter for adjustment thereof. The yoke has a lower portion 94b to which is secured a threaded downwardly extending non-rotatable adjusting rod 95 threadedly receiving an adjusting wheel 96. The adjusting wheel rests at the upper end of a support tube 97 mounted on a reinforcing plate 98 on top of the deck plate 74. The adjusted height of the cutter is shown by the index markings 93a on the rod 93 which are exposed above the surface of the deck plate 74 to show the cutter height.

When the yoke and cutter are lifted, the operator can easily rotate the adjusting wheel 96 up or down on the threaded rod 95, and when the handle 94a is released the wheel will rest on top of the tube 97, supporting the cutter at its adjusted height.

Figure 8:
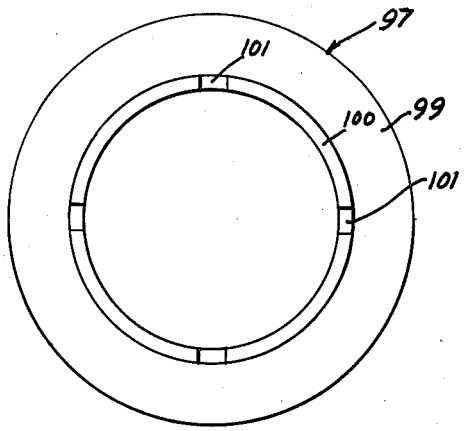
FIGURE 8 is an enlarged vertical sectional view taken substantially along line VIII—VIII of FIGURE 5 with parts removed for clarity.
Figure 9:
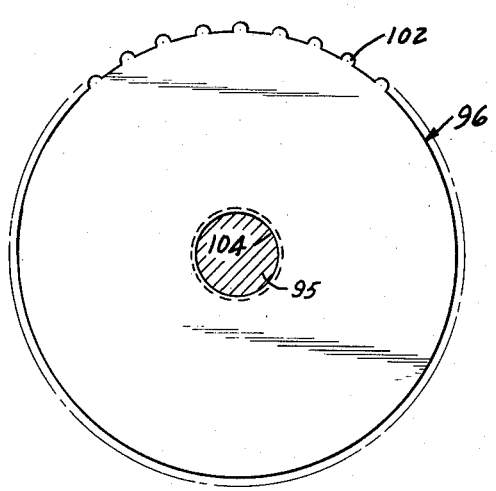
FIGURE 9 is an enlarged view taken substantially along line IX—IX of FIGURE 5.
Figure 10:
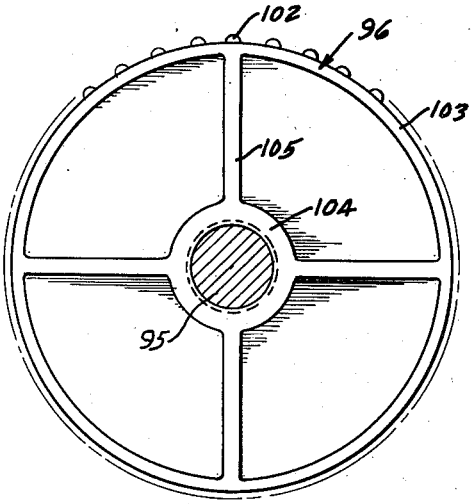
FIGURE 10 is an enlarged view taken substantially along X—X of FIGURE 5.

As illustrated in the detailed showings of FIGURES 8, 9 and 10, the tube 97 has a lower horizontal flanged portion 99 and a vertical tubular portion 100. At the top edge of the tubular portion are notches such as 101 which receive the edges of webs 105 on the adjusting wheel and hold it against rotation.

The adjusting wheel 96 has ribs 102 mounted on an outer peripheral flange 103, for ease of manual rotation. A central hub 104 is threaded and the webs 105 extend between the hub and the flange 103. Four webs 105 are illustrated to match the spacing of the notches 101 but different spacings may be employed.

As illustrated in FIGURES 11 and 12, the deck plate 74 and the plate 98 are provided with an opening 106 so that the splined shaft 89, FIGURE 5, may pass therethrough for raised adjusted positions of the cutter. The deck plate is also provided with openings such as 112 for the foot controls. The plate and the tubular frame member 75 are shaped to provide a small ramp portion 109 leading from a lower deck portion to a slightly raised deck portion for comfort and convenience of the operator. At the back of the frame, the frame members 84 and 85 are bent slightly inwardly and are notched at their ends 84a and 85a and rigidly secured, at such ends, as by welding, for example, to a cross member or draw bar 113. A hitching bracket 114 is secured, as by welding, to the center of the draw bar for using the mower to pull other implements. The frame is further assembled and rigidified by the frame members 84 and 85 being welded to the rear ends of the main frame 75, which are bent slightly inwardly, at 115 and 116. The forward ends of the frame members 84 and 85 are notched at 117 and 118 and welded to the front portion of the tubular frame member 75. This provides an integral strong fabricated frame.

In operation with the arrangement of FIGURES 1 through 4, the operator pushes the mower over the area being clipped and for simple adjustment raises the locking pin 44, FIGURE 3, and rotates the adjustment knob 39. The adjustment rod 38 carries the adjustment shaft 32 up or down pivoting the adjustment plates 20 and 21 for the rear wheels 17 and 18 and transmitting the same pivotal movement through the interconnecting rods 33 and 34 to the plates 22 and 23 for the front wheels. This simultaneously adjusts the positions of all of the wheels and the elevation of the cutter is shown by the pointer 49 on the scale 51, FIGURE 4.

With the embodiment of FIGURES 5 through 12, the operator grips the handle 94a of the yoke 94, FIGURES 5 and 7, and raises the adjusting wheel 96 clear of the upper end of the tube 97 and rotates the wheel to the desired adjusted position. The operator then drops the yoke and the wheel 96 will rest on the tube 97 supporting the housing and cutter 60 in the adjusted position. This can be simply done while the mower is in operation and even without stopping clipping inasmuch as the pulley 88 will continue to drive the cutter 60 through the splined shaft 89.

Thus it will be seen that we have provided an improved adjustable rotary mower meeting the objectives and advantages here and above set forth. The arrangement attains an adjustment mechanism which makes it possible for an operator to always cut a lawn at the optimum height without loss of time or inconvenience caused by the adjustment. The mechanism is sturdy in construction, is inexpensive to manufacture and is particularly safe for the operator. In addition to providing ease of adjustment, the support arrangement for the cutter and its housing affords floating suspension therefor so that the cutter and housing can move upwardly with respect to the frame and the wheels if an obstacle is encountered.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim:

1. An adjustable power mower comprising a power driven cutter, an engine connected to said cutter, a housing enclosing said cutter and supporting said engine, wheels disposed at each side of said housing, a wheel mount for each of said wheels pivotally secured to said housing and rotatably supporting a wheel for rotation about an axis eccentric to the pivotal axis of said wheel mount, rods connecting said wheel mounts at each side of said housing, an elevation adjustment shaft extending across said mower and connected to oppositely disposed wheel mounts serving as the axis for the wheels on such wheel mounts, means defining arcuate slots in said housing accommodating elevational movement of said elevation adjustment shaft an elevational adjustment knob for said elevation adjustment shaft rotatably mounted on said housing, a collar connected to said elevation adjustment shaft, an adjustment screw secured to said collar and received by said elevational adjustment knob, means releasably locking said elevational adjustment knob against rotation, an index pointer connected to said collar, and an index adjacent said pointer indicating the relative height of said cutter with respect to said wheels.

2. An adjustable power mower comprising a power driven cutter, an engine connected to said cutter, a housing enclosing said cutter and supporting said engine, front and rear wheels at each side of said housing, a wheel mount for each of said wheels pivotally secured to said housing and rotatably supporting a wheel for rotation about an axis eccentric to the pivotal axis of said mount, connecting rods nonyieldingly connected between said wheel mounts at each side of said housing, an elevation adjustment shaft extending across said mower and rigidly connected to oppositely disposed wheel mounts eccentrically of their pivotal axis, means defining arcuate slots in the side of said housing accommodating vertical movement of said elevation adjustment shaft, an internally threaded adjustment knob rotatably mounted on said housing, a collar connected to said elevation adjustment shaft and having a longitudinal slot, a vertically movable threaded adjustment screw secured to said collar and threadably received by said internally threaded adjustment knob, means releasably locking said knob against rotation, an index pointer connected to said collar and extending through said housing, and an index on said housing adjacent said pointer indicating the relative height of said cutter with respect to said wheels.

References Cited in the file of this patent

UNITED STATES PATENTS

| | | |
|---|---|---|
| 1,852,100 | Ballou | Apr. 5, 1932 |
| 2,776,844 | Wilkin | Jan. 8, 1957 |
| 2,848,859 | Abel | Aug. 26, 1958 |
| 2,909,884 | Knarzer | Oct. 27, 1959 |
| 2,926,926 | Rowe et al. | Mar. 1, 1960 |
| 2,986,402 | Winton | May 30, 1961 |